(12) United States Patent
Liao et al.

(10) Patent No.: US 7,623,191 B2
(45) Date of Patent: Nov. 24, 2009

(54) LIQUID CRYSTAL DISPLAY DEVICES

(75) Inventors: Chia-Te Liao, Kaohsiung (TW);
Shih-Min Chao, Kaohsiung (TW);
Tean-Sen Jen, Taoyuan Hsien (TW);
Yun-Bok Lee, Tainan County (TW);
Chia-Hua Yu, Taipei County (TW)

(73) Assignee: Hannstar Display Corp., Tao-Yuan Hsien (TW)

( * ) Notice: Subject to any disclaimer, the term of this patent is extended or adjusted under 35 U.S.C. 154(b) by 346 days.

(21) Appl. No.: 11/532,982

(22) Filed: Sep. 19, 2006

(65) Prior Publication Data

US 2008/0068549 A1  Mar. 20, 2008

(51) Int. Cl.
*G02F 1/1333*  (2006.01)
*G02F 1/136*   (2006.01)

(52) U.S. Cl. .......................................... 349/40; 349/47
(58) Field of Classification Search ................... 341/40, 341/47
See application file for complete search history.

(56) References Cited

U.S. PATENT DOCUMENTS

| | | | | |
|---|---|---|---|---|
| 6,256,081 B1 * | 7/2001 | Lee et al. | | 349/141 |
| 6,600,542 B2 * | 7/2003 | Kim et al. | | 349/141 |
| 6,856,371 B2 | 2/2005 | Kim et al. | | |
| 6,897,930 B2 * | 5/2005 | Nakayoshi et al. | | 349/139 |
| 7,006,189 B2 * | 2/2006 | Kim et al. | | 349/141 |
| 7,050,136 B2 * | 5/2006 | Lee et al. | | 349/141 |
| 7,227,609 B2 * | 6/2007 | Lee | | 349/146 |
| 7,262,826 B2 * | 8/2007 | Lee et al. | | 349/141 |
| 2002/0030782 A1 * | 3/2002 | Lee | | 349/143 |
| 2002/0041354 A1 * | 4/2002 | Noh et al. | | 349/141 |
| 2002/0057411 A1 * | 5/2002 | Kim et al. | | 349/141 |
| 2002/0159016 A1 * | 10/2002 | Nishida et al. | | 349/141 |
| 2002/0163604 A1 * | 11/2002 | Kim et al. | | 349/43 |
| 2003/0137615 A1 * | 7/2003 | Nakayoshi et al. | | 349/43 |
| 2004/0032384 A1 * | 2/2004 | Ohta et al. | | 345/87 |
| 2004/0090564 A1 * | 5/2004 | Lee | | 349/43 |
| 2004/0125304 A1 * | 7/2004 | Lee et al. | | 349/141 |
| 2004/0156005 A1 * | 8/2004 | Lee | | 349/141 |
| 2004/0178977 A1 * | 9/2004 | Nakayoshi et al. | | 345/87 |
| 2004/0257512 A1 * | 12/2004 | Yoo et al. | | 349/141 |
| 2004/0263755 A1 * | 12/2004 | Kim et al. | | 349/141 |
| 2005/0078262 A1 * | 4/2005 | Ono et al. | | 349/141 |
| 2005/0094063 A1 * | 5/2005 | Lee et al. | | 349/110 |
| 2005/0099570 A1 * | 5/2005 | Matsumoto et al. | | 349/141 |
| 2005/0117104 A1 * | 6/2005 | Nishida et al. | | 349/141 |
| 2005/0174521 A1 * | 8/2005 | Nishida et al. | | 349/141 |

(Continued)

*Primary Examiner*—K. Cryrus Kianni
(74) *Attorney, Agent, or Firm*—Thomas, Kayden, Horstemeyer & Risley (57) ABSTRACT

Fringe field switching mode liquid crystal display (FFS LCD) devices are disclosed. A first substrate is disposed opposing a second substrate with a gap therebetween. A liquid crystal layer is interposed between the first and the second substrate. A gate line and data lines are formed on the first substrate in a matrix configuration and defining pixel areas. A counter electrode is disposed on each pixel area of the first substrate. A pixel electrode is disposed above the counter electrode with an insulating layer therebetween. The pixel electrode includes a plurality of parallel electrodes. Each electrode includes a first segment, a second segment, and a third segment, wherein the first segment has an included angle θ from the horizontal direction, the second segment has an included angle φ from the horizontal direction, and the first segment has an included angle θ from the horizontal direction.

8 Claims, 12 Drawing Sheets

U.S. PATENT DOCUMENTS

| | | |
|---|---|---|
| 2005/0190313 A1* | 9/2005 | Wang .......................... 349/38 |
| 2005/0190316 A1* | 9/2005 | Takahashi et al. ............. 349/44 |
| 2005/0280763 A1* | 12/2005 | Kang et al. ................. 349/141 |
| 2006/0044503 A1* | 3/2006 | Ham et al. .................. 349/141 |
| 2007/0064187 A1* | 3/2007 | Takeda et al. ............... 349/127 |
| 2007/0121047 A1* | 5/2007 | Chung et al. ................ 349/141 |
| 2007/0153205 A1* | 7/2007 | Jin et al. .................... 349/141 |
| 2009/0009708 A1* | 1/2009 | Higa et al. .................. 349/155 |

* cited by examiner

LIQUID CRYSTAL DISPLAY DEVICES

BACKGROUND OF THE INVENTION

1. Field of the Invention

The invention relates to liquid crystal display (LCD) devices, and more particularly to fringe field switching mode liquid crystal display (FFS-LCD) devices.

2. Description of the Related Art

Liquid crystal display (LCD) devices possess the advantages of small size, light weight and low power consumption, thus increasing portability and applicability in a wide variety of electronic and communication devices including notebook computers, personal digital assistants (PDA), mobile phones and similar. Critical features for large-scale monitors and high-end TV applications, include fast response, high contrast ratio, high transparency, and wide viewing angle without gray scale inversion. In-plane switching (IPS) mode liquid crystal display devices meet the above-mentioned high quality display feature requirements, and solve the viewing angle problems by orienting the liquid crystal molecules to be parallel with a substrate.

Fringe field switching liquid crystal display (FFS-LCD) devices have pixel and counter electrodes comprise transparent conductors and a narrower distance between electrodes than the distance between the upper and lower substrates to form a fringe field on the electrodes. In operation, the fringe field on the electrodes forces the substantially homogeneous liquid crystal molecules to rotate transversely between the substrates in which a wide viewing angle is accomplished since the light is transmitted through the horizontally arranged liquid crystal molecules. Moreover, since the counter electrode and the pixel electrode comprise transparent conductive materials, the aperture ratio and the transmittance ratio of the display devices can thereby be improved.

U.S. Pat. No. 6,856,371, the entirety of which is hereby incorporated by reference, discloses electrode structures of a conventional FFS-LCD device. The electrode structures are symmetrical and render high image display quality and high transmittance ratio.

Figure 1:
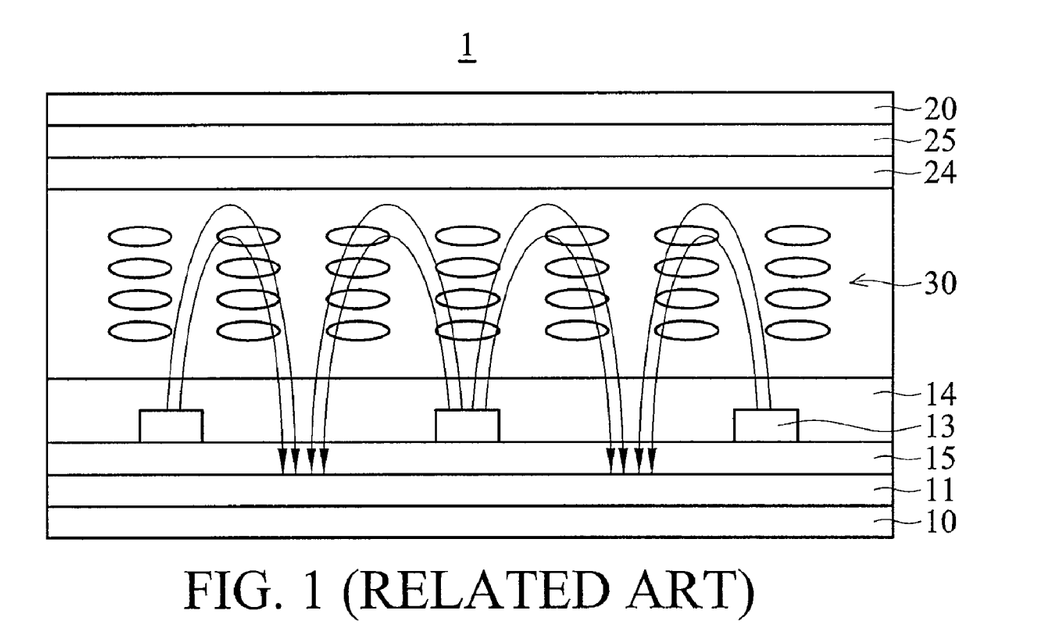
FIG. 1 is a cross section of a conventional fringe field switching liquid crystal display (FFS-LCD) device.

FIG. 1 is a cross section of a conventional fringe field switching liquid crystal display (FFS-LCD) device. An FFS-LCD 1 comprises a first substrate (an upper substrate) 10, a second substrate (a lower substrate) 20, and a liquid crystal layer 30 interposed between the first substrate 10 and the second substrate 20, serving as an LCD cell. A counter electrode 11 and a plurality of pixel electrodes 13 are disposed on the first substrate 10. An insulating layer 15 is disposed between the counter electrode 11 and the plurality of pixel electrodes 13. A lower alignment layer 14 is disposed on the insulating layer 15 and covers the pixel electrodes 15. A color filter layer 25 and an upper alignment layer 24 are disposed on the inner surface of the second substrate 20 and adjust the liquid crystal layer 30.

Figure 2:
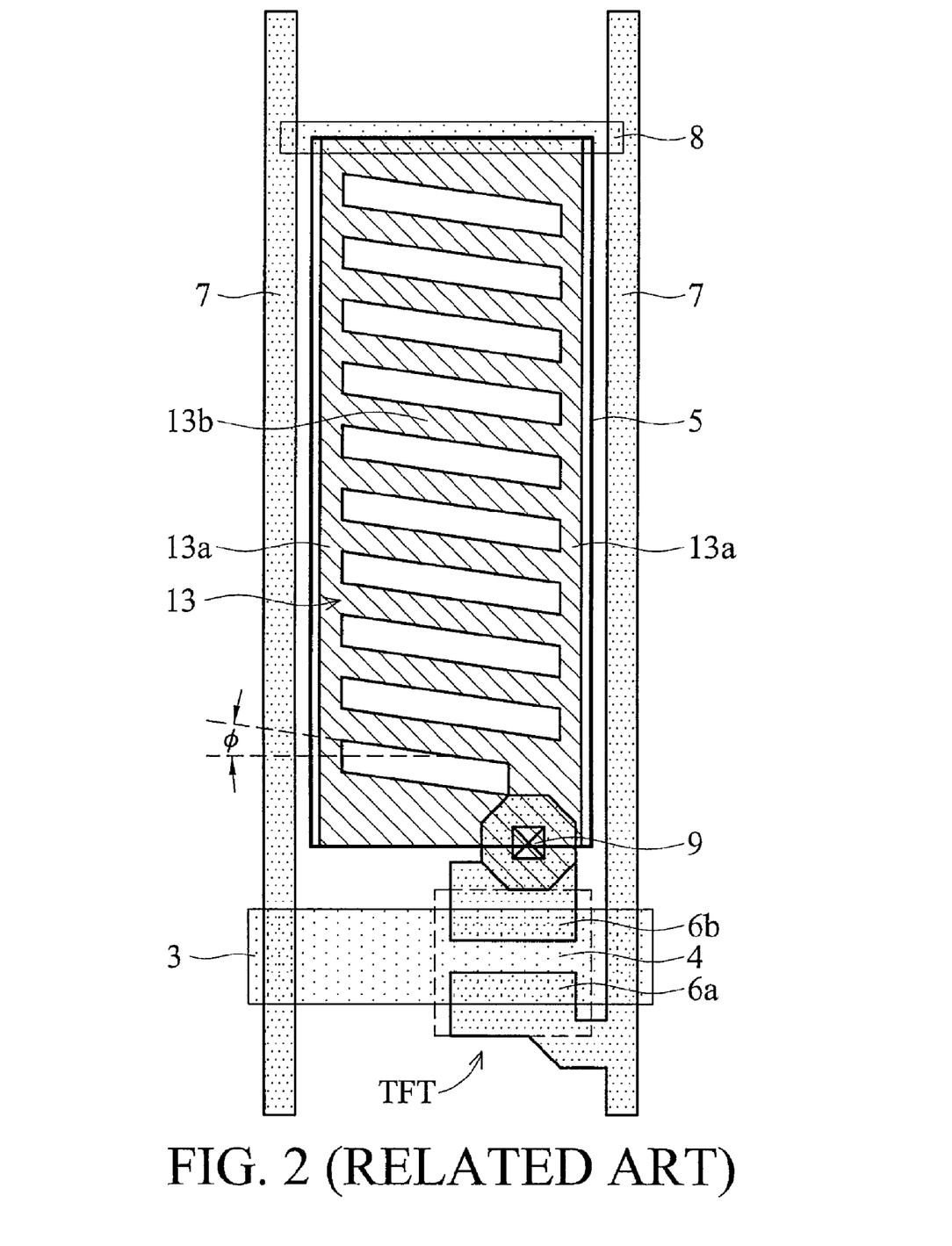
FIG. 2 is a plan view of the lower substrate structure of a conventional fringe field switching liquid crystal display (FFS-LCD) device.

FIG. 2 is a plan view of the lower substrate structure of a conventional fringe field switching liquid crystal display (FFS-LCD) device. Two parallel gate lines 3 and two parallel data lines 7 are orthogonally intersected, enclosing a pixel area. A counter electrode 11 and pixel electrodes 13 are disposed in the pixel area. The pixel electrodes 15 comprise two electrode bras 13a parallel to the data lines 7 and a plurality of inclined electrodes 13b with an inclined angle φ. The two ends of each electrode 13b are separately connected to the two electrode bras 13a. Note that the inclined angle φ of the electrodes 13b directly affects the operating voltage of the FFS-LCD device. More specifically, the greater the inclination of electrodes 13b, the higher the voltage required to operate the FFS-LCD device.

For small FFS-LCD panels, the inclined angle φ of the electrodes 13b must be reduced to lower the operating voltage of the FFS-LCD device. A low inclined angle φ of electrodes 13b (e.g., less than 7°) can cause the disclination effect deteriorating display image quality. Conversely, high inclined angle φ of the electrodes 13b requires a high driving voltage such that the physical area of the thin film transistor (TFT) must be increased to provide adequate charge storage capability. The TFT structure comprises a gate electrode 3, a channel and source/drain regions 4, and source contact 6a and drain contact 6b. The drain contact 6b connects the pixel electrodes 13 via a contact plug 9. When the physical area of the thin film transistor (TFT) increases, however, the area of the pixel electrodes 13 must be reduced, thus, a small aperture ratio and a low transmittance ratio occur.

Thus, low operating voltage FFS-LCD devices with improved aperture and transmittance ratios, capable of preventing the disclination effect are desirable.

BRIEF SUMMARY OF THE INVENTION

A detailed description is given in the following embodiments with reference to the accompanying drawings.

The invention is directed to electrode structures of an FFS-LCD device. The electrode structures comprise multiple deflected electrodes thereby providing an FFS-LCD device having low operating voltage, preventing the disclination effect and improving aperture and transmittance ratios.

Liquid crystal display devices are provided. An exemplary embodiment of a liquid crystal display device comprises oppositely disposed first and second substrates with a predetermined gap therebetween. A liquid crystal layer is interposed between the first and the second substrates. A gate line and a data line are disposed on the first substrate in a matrix configuration and defining pixel areas. A counter electrode is disposed on each pixel area of the first substrate. A first pixel electrode is disposed on the counter electrode with at least one insulating layer therebetween. The first pixel electrode comprises a plurality of parallel electrodes, and each electrode comprises a first segment, a second segment, and a third segment; the first segment includes an angle of θ from the horizontal, the second segment includes an angle of φ from the horizontal, and the third segment includes an angle of θ from the horizontal, and wherein the angle of θ is greater than the angle of φ.

Note that the liquid crystal display device further comprises a second pixel electrode disposed on the counter electrode with at least one insulating layer therebetween. The second pixel electrode comprises a plurality of parallel electrodes, and each electrode comprises a sixth segment, a seventh segment, and a eighth segment. The sixth segment includes an angle of −θ from the horizontal. The seventh segment includes an angle of −φ from the horizontal. The eighth segment includes an angle of −θ from the horizontal, and the angle of −θ is greater than the angle of −φ.

Another exemplary embodiment of a liquid crystal display device comprises: oppositely disposed first and second substrates with a predetermined gap therebetween; a liquid crystal layer interposed between the first and the second substrates; a gate line and a data line disposed on the first substrate in a matrix configuration and defining pixel areas; a counter electrode disposed on each pixel area of the first substrate; a pixel electrode disposed on the counter electrode with at least one insulating layer therebetween; wherein the pixel electrode comprises a plurality of parallel electrodes, and each electrode comprises a first segment, a second segment, and a third segment; wherein the first segment includes an angle of θ from the horizontal, the second segment includes an angle of φ from the horizontal, and the third segment includes an angle of θ from the horizontal, wherein the angle of θ is greater than the angle of φ; the pixel electrode further comprises a fourth segment connecting the first segment of the odd electrodes and the third segment of the even electrodes, and fifth segment connecting the third segment of the odd electrodes and the first segment of the even electrodes.

Some embodiments of a liquid crystal display device comprise: oppositely disposed first second substrates with a predetermined gap therebetween; a liquid crystal layer interposed between the first and the second substrates; a gate line and a data line disposed on the first substrate in a matrix configuration and defining pixel areas; a counter electrode disposed on each pixel area of the first substrate; a pixel electrode disposed on the counter electrode with at least one insulating layer therebetween; wherein the pixel electrode with a first portion comprising a plurality of parallel electrodes, and each electrode comprises a first segment, a second segment, and a third segment; wherein the first segment includes an angle of θ from the horizontal, the second segment includes an angle of φ from the horizontal, and the third segment includes an angle of θ from the horizontal, and wherein the angle of θ is greater than the angle of φ; wherein the pixel electrode with a second portion comprising a plurality of parallel electrodes, and each electrode comprises a sixth segment, a seventh segment, and an eighth segment; wherein the sixth segment includes an angle of −θ from the horizontal, the seventh segment includes an angle of −φ from the horizontal, and the eighth segment includes an angle of −θ from the horizontal, and wherein the angle of −θ is greater than the angle of −φ.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

FFS-LCD devices comprising electrode structures with multiple deflected electrodes are provided. The provided FFS-LCD devices have low operating voltage, thus, the disclination effect is prevented and the aperture ratio and transmittance ratio are improved.

First Embodiment

Figure 3:
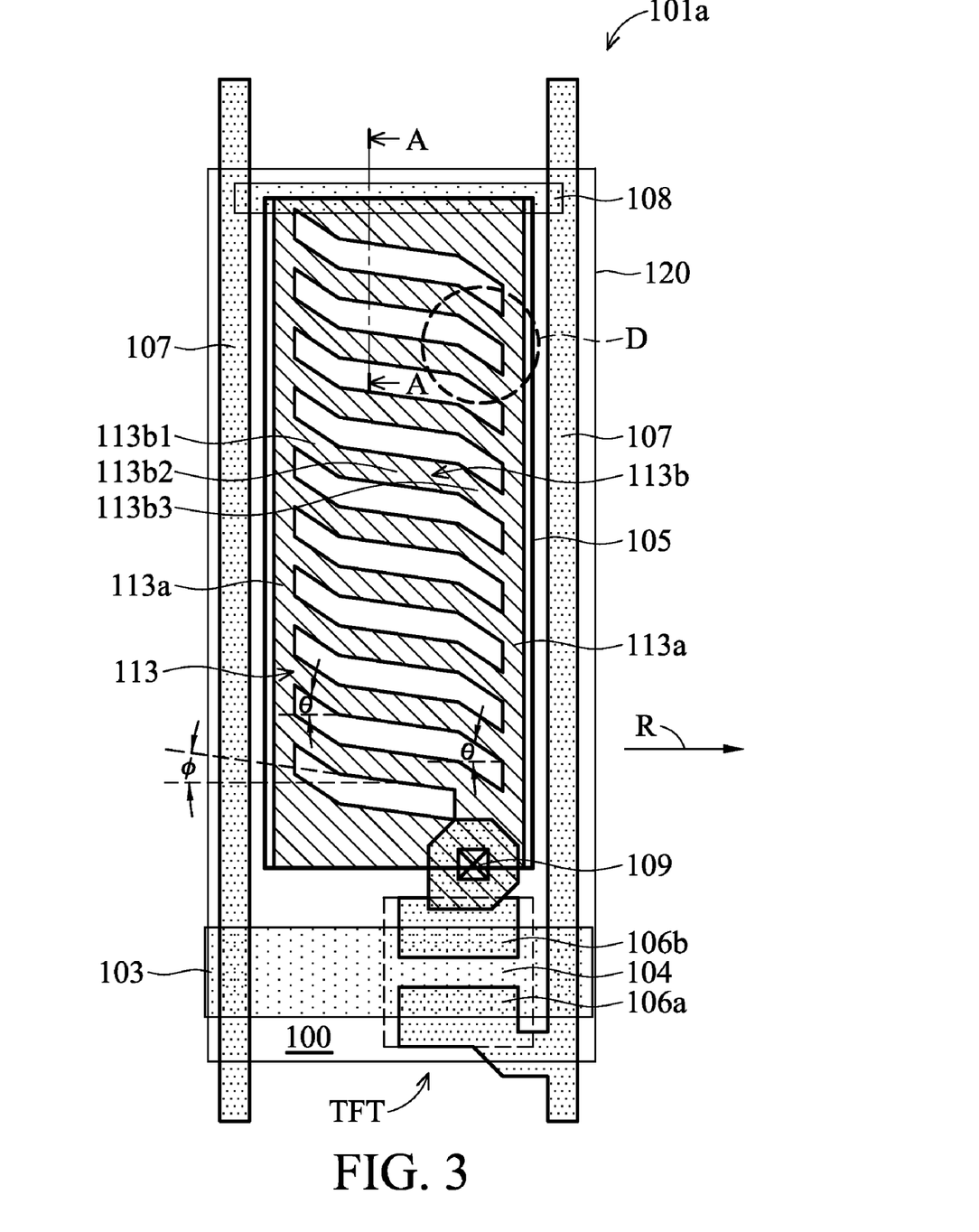
FIG. 3 is a plan view of an electrode structure in each pixel area of an FFS-LCD device according to a first embodiment of the invention.

FIG. 3 is a plan view of an electrode structure in each pixel area of an FFS-LCD device according to a first embodiment of the invention. In the active matrix array substrate 101a of FIG. 3, a unit electrode structure comprises a plurality orthogonally intersecting gate lines 103 and data lines 107 disposed on a substrate 100. A plurality of pixel areas are defined by two adjacent gate lines 103 and data lines 107. A counter electrode 105 is disposed on the substrate 100 and in each pixel area. A first pixel electrode 113 is disposed on the counter electrode 105 with at least one insulating layer (referring to the first insulating layer 109 and the second insulating layer 110 of FIG. 5) therebetween, wherein the first pixel electrode 113 comprises two electrode bars 113a parallel to the data lines 107 and a plurality of parallel electrodes 113b. Each electrode 113b comprises a first segment 113b1, a second segment 113b2, and a third segment 113b3. The first segment 113b1 includes an angle of θ from the horizontal. The second segment 113b2 includes an angle of φ from the horizontal. The third segment 113b3 includes an angle of θ from the horizontal. The angle of θ is greater than the angle of φ. For example, the angle of θ is approximately in a range between 1° and 80° and the angle of φ is approximately in a range between 0° and 79°. Since in the region D neighboring the electrode bar 113a, the angle of θ of the third segment 113b3 deviating from the horizontal is greater than the angle of φ, the disclination effect can thus be prevented.

FIG. 3 shows a TFT device disposed at the intersection of each gate line 103 and data line 107 electrically coupled to the first pixel electrode 113. The TFT device comprises a gate electrode 103, a channel and source/drain regions 104, and source contact 106a and drain contact 106b. The drain contact 106b connects the first pixel electrodes 113 via a contact plug 109. By deflecting the angle of θ of the third segment 113b3 greater than the angle of φ, the physical area of TFT device can be reduced, and the area of the first pixel electrodes 113 can nonetheless be increased resulting in improved high aperture ratio and high transmittance ratio.

Note that an alignment layer 120 which is horizontally rubbed (indicated as rubbing direction R) is optionally formed on the pixel electrode 113 of the substrate structure 101a.

Figure 4A:
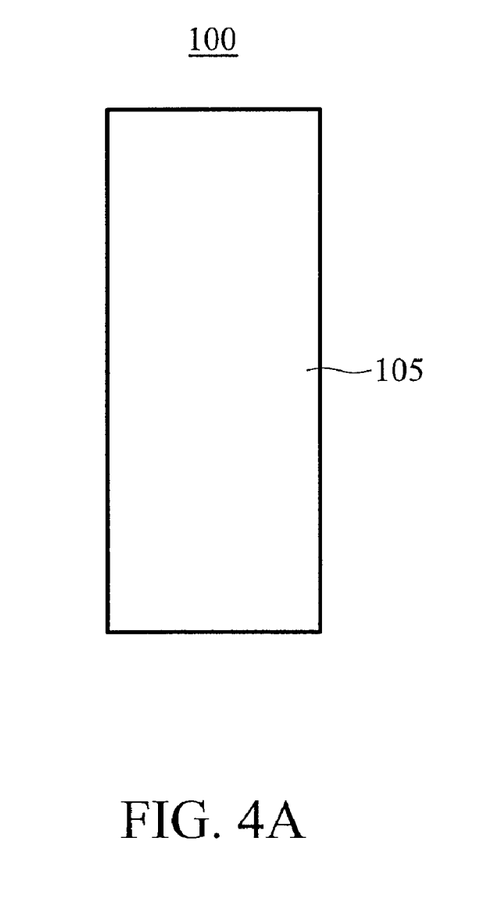
FIGS. 4A-4F are cross sections of the steps of fabricating the electrode structure of an FFS-LCD device according to a first embodiment of the invention.
Figure 4B:
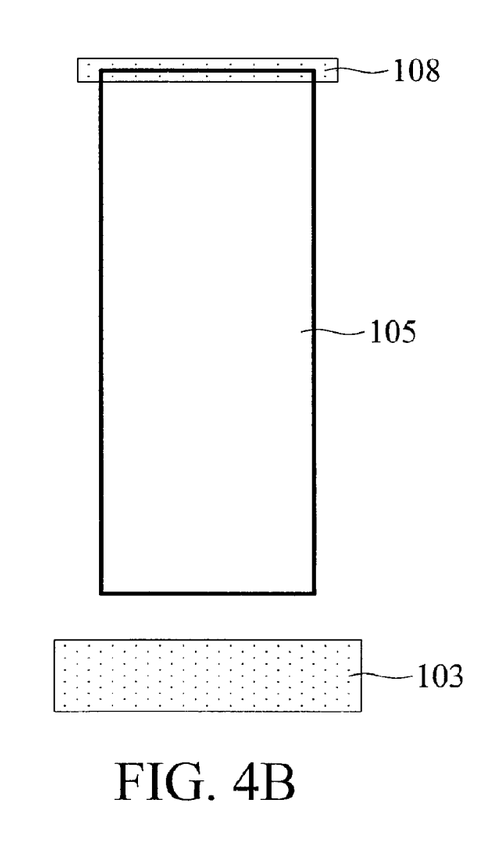

FIGS. 4A-4F are cross sections of the steps of fabricating the electrode structure of an FFS-LCD device according to a first embodiment of the invention. Referring to FIG. 4A, a substrate 100 such a transparent glass substrate or a plastic substrate is provided. A patterned counter electrode is formed on the substrate 100. Referring to FIG. 4B, a patterned first metal layer including gate lines 103 and common electrode lines 108 is formed on the substrate 100, wherein the common electrode lines 108 and the counter electrode 105 are operatively electrically connected. The gate lines 103 and common electrode line 108 are parallel and made from metal materials such as aluminum (Al), molybdenum (Mo), or other conductive materials. A gate insulating layer 109 is subsequently formed on the substrate 100 and covering the counter electrode 105, gate lines 107, and the common electrode lines 108.

Figure 4C:
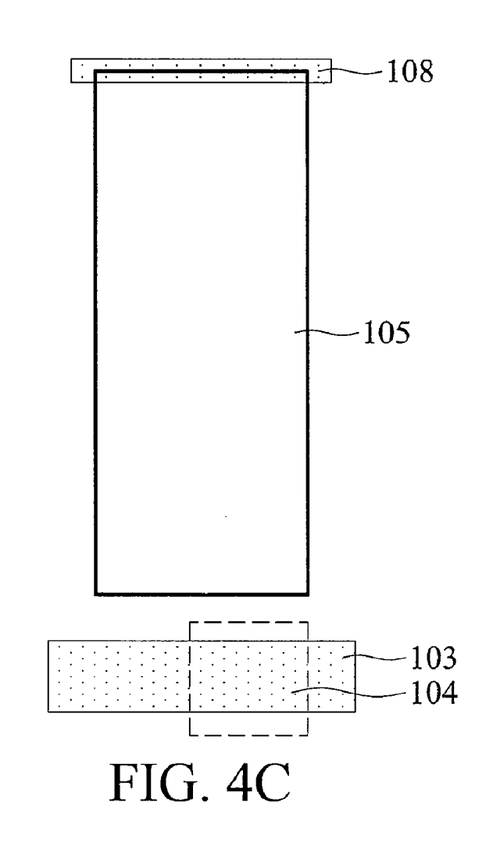
Figure 4D:
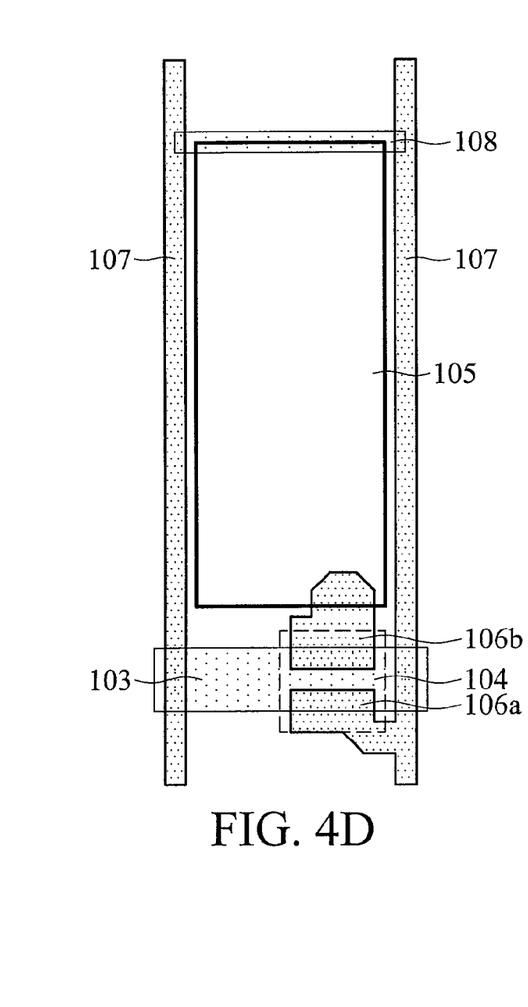
Figure 4E:
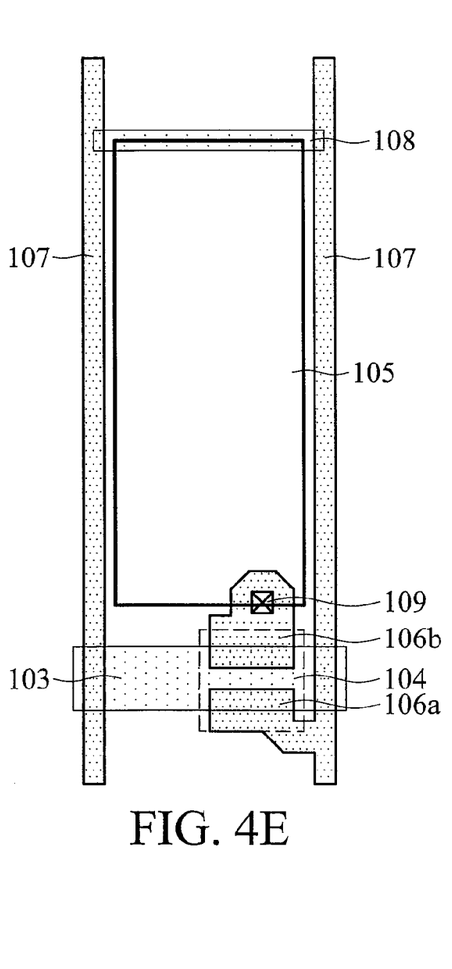
Figure 4F:
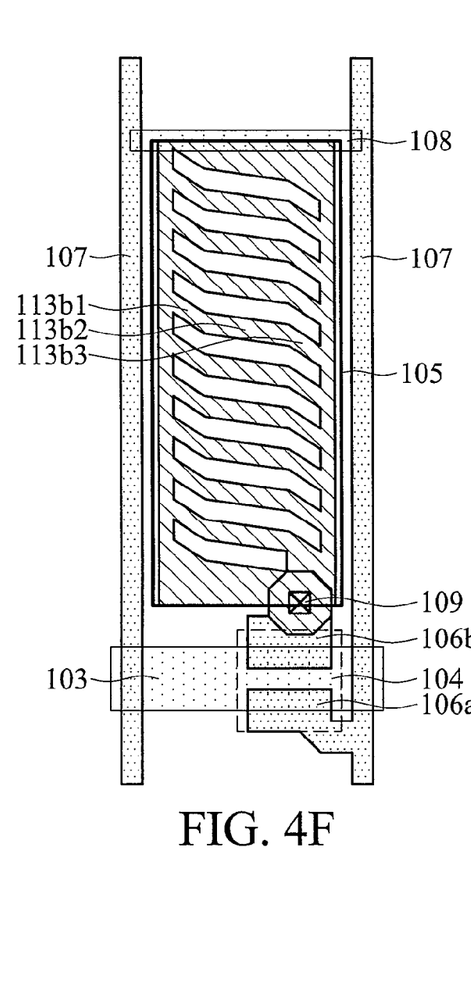

Referring to FIG. 4C, a patterned semiconductor layer is formed covering part of the gate lines 103. For example, a semiconductor island 104 including an amorphous silicon island or polysilicon island is formed part of the gate line 103 to serve as a carrier channel region. A source region and a drain region are separately formed on both sides of the carrier channel region. Referring to FIG. 4D, a patterned second metal layer is formed on the substrate 100. The patterned second metal layer comprises data lines 107, source contact 106a and drain contact 106b. The second metal layer is preferably comprises metal materials such as aluminum (Al), molybdenum (Mo), or other conductive materials. A second insulating layer 110 (referring to FIG. 5) is deposited and patterned creating a contact plug 109 on the drain contact 106b.

Referring to FIG. 4C, a patterned semiconductor layer is formed covering part of the gate lines 103. For example, a semiconductor island 104 including an amorphous silicon island or polysilicon island is formed part of the gate line 103 to serve as a carrier channel region. A source region and a drain region are separately formed on both sides of the carrier channel region. Referring to FIG. 4D, a patterned second metal layer is formed on the substrate 100. The patterned second metal layer comprises data lines 107, source contact 106a and drain contact 106b. The second metal layer is preferably comprises metal materials such as aluminum (Al), molybdenum (Mo), or other conductive materials. A second insulating layer 110 (referring to FIG. 5) is deposited and patterned creating a contact plug 109 on the drain contact 106b.

Figure 5:
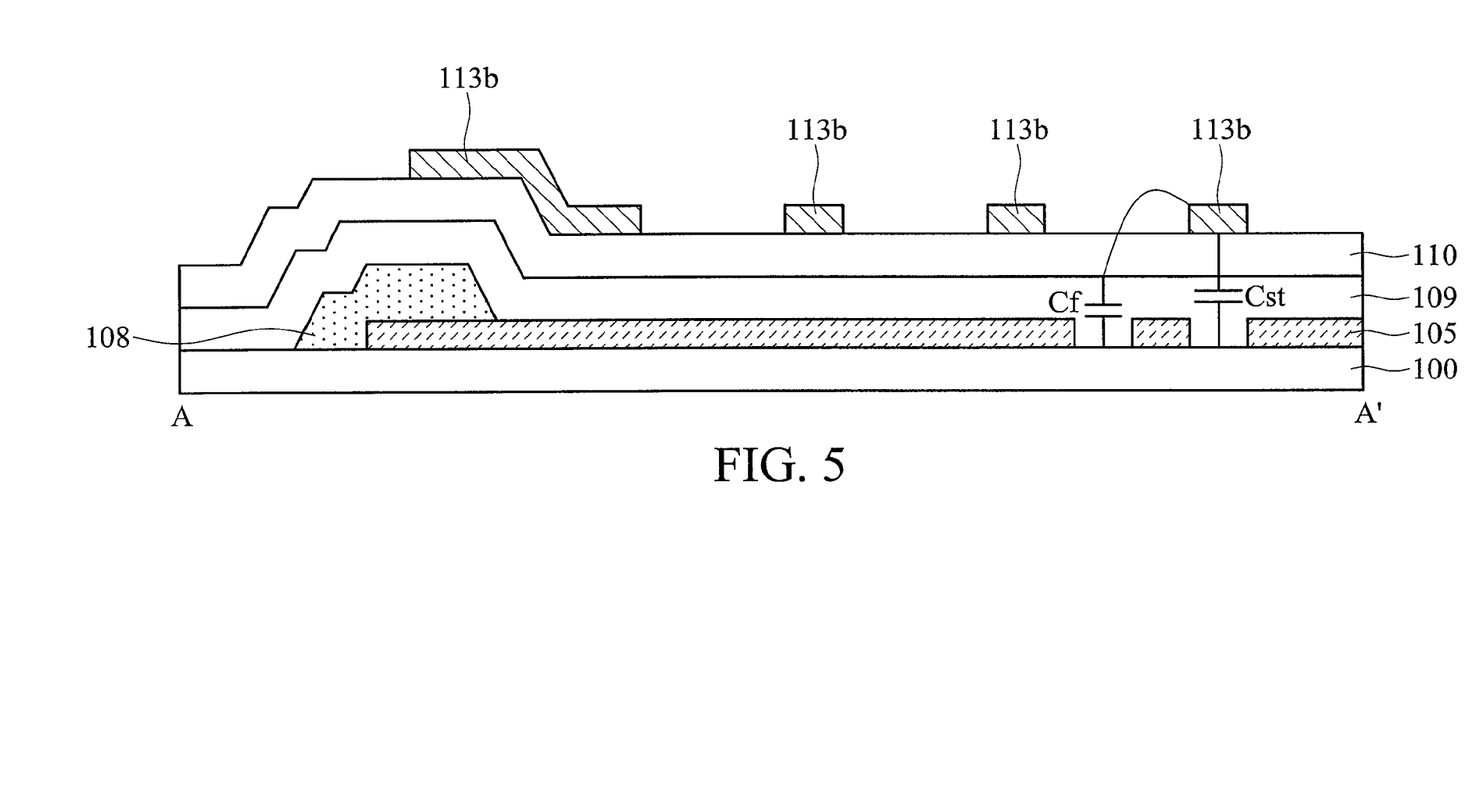
FIG. 5 is a cross section of the electrode structure in each pixel area of an FFS-LCD device taken along the line A-A' of FIG. 3.
Figure 6:
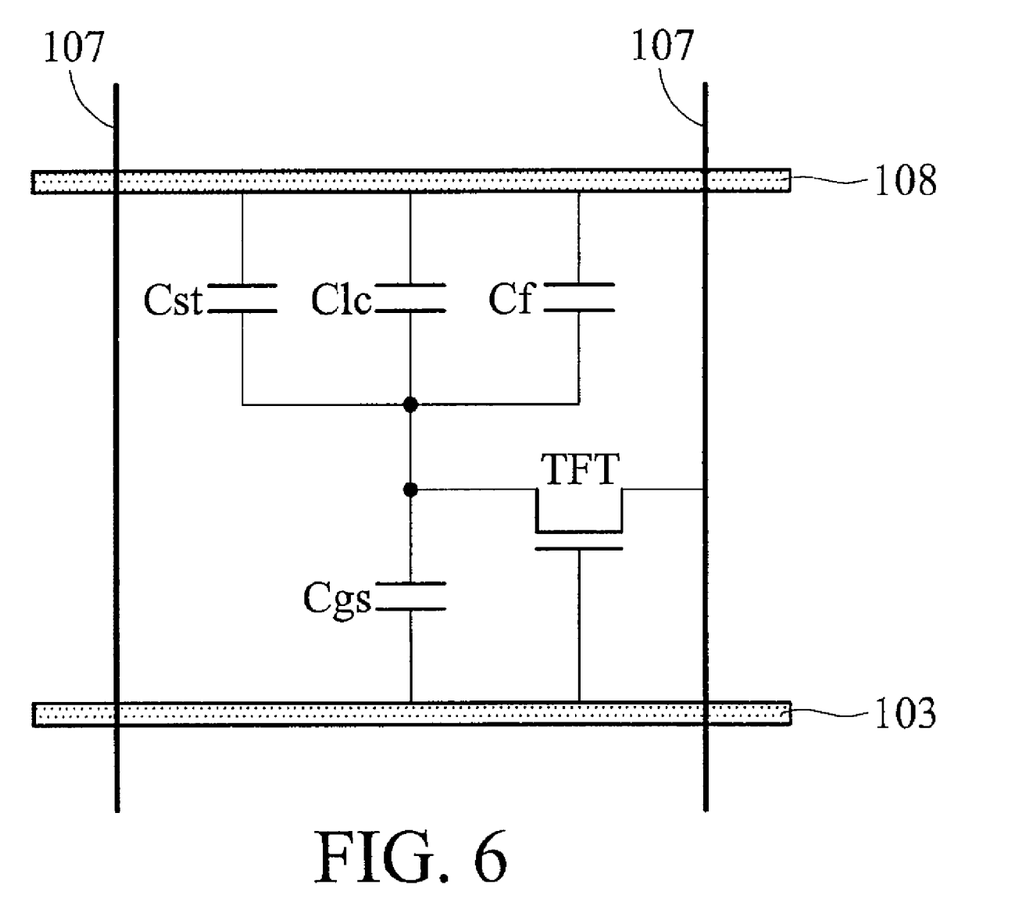
FIG. 6 is an equivalent circuit of the electrode structure in each pixel area of an FFS-LCD device of FIGS. 3 and 5.

FIG. 5 is a cross section of the electrode structure in each pixel area of an FFS-LCD device taken along the line A-A' of FIG. 3. FIG. 6 is an equivalent circuit of the electrode structure in each pixel area of an FFS-LCD device of FIG. 3 and FIG. 5. Referring to FIG. 5, a storage capacitor $C_{st}$ and a fringe capacitor $C_f$ are induced between the electrode 131b of the pixel electrode structure 131 and the counter electrode 105. The capacitances of the storage capacitor $C_{st}$ and the fringe capacitor $C_f$ are increased as the overlying area between the electrode 131b of the pixel electrode structure 131 and the counter electrode 105. The larger overlying area between the electrode 131b of the pixel electrode structure 131 and the counter electrode 105 is, the larger the TFT devices are required to be to provide adequate charge storage capacity. When the physical area of the thin film transistor (TFT) device increases, however, the aperture ratio and low transmittance ratio of the FFS-LCD device are decreased. By deflecting the angle of θ greater than the angle of φ, the physical area of TFT device can be reduced by improving the aperture ratio and high transmittance ratio.

Figure 7:
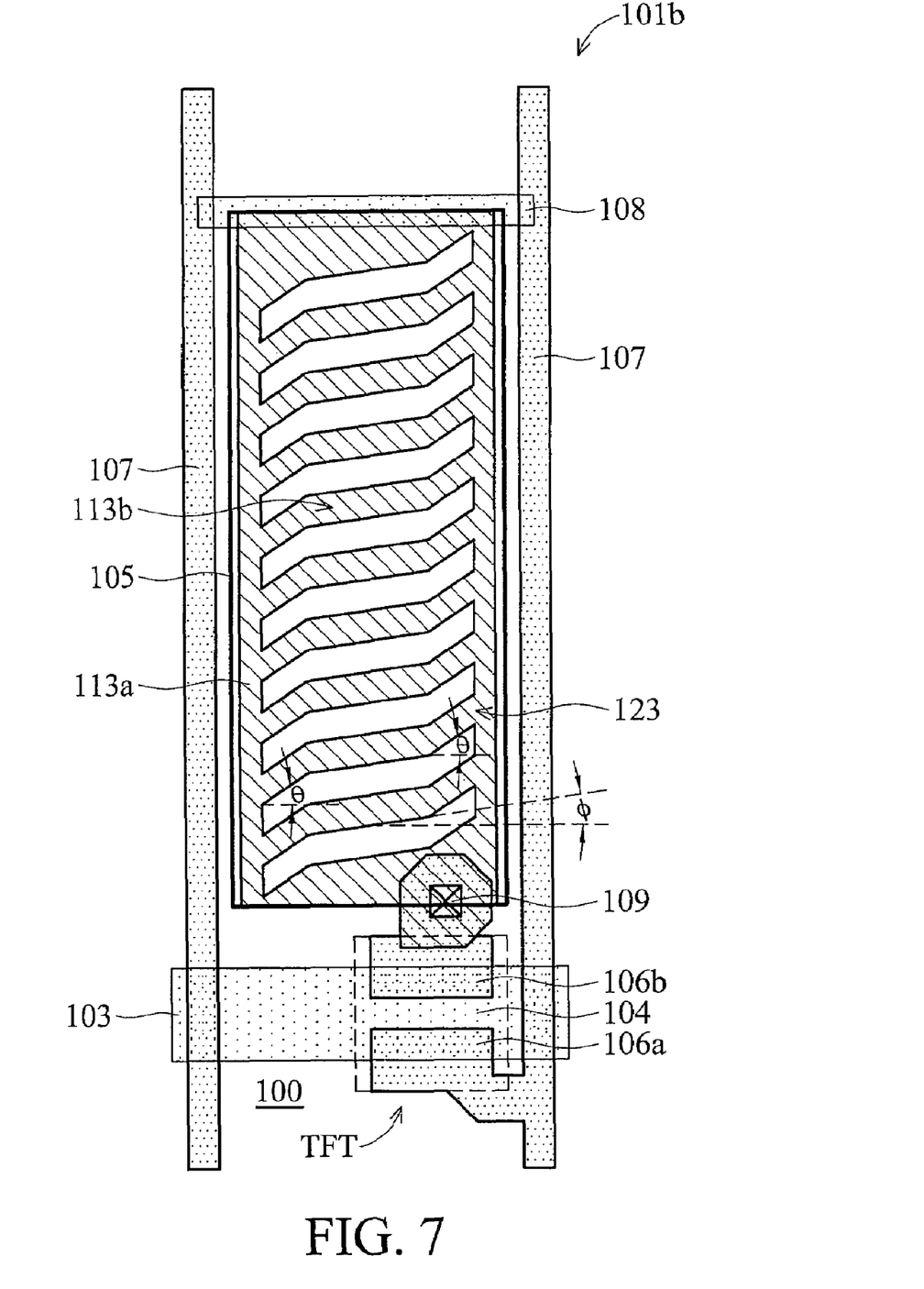
FIG. 7 is a plan view of a variation of the electrode structure in each pixel area of an FFS-LCD device according to a first embodiment of the invention.

FIG. 7 is a plan view of a variation of the electrode structure in each pixel area of an FFS-LCD device according to a first embodiment of the invention. In the active matrix array substrate 101b of FIG. 7, the electrode structure in each pixel area is nearly identical to the electrode structure in each pixel area of the first embodiment in FIG. 3 and for simplicity its detailed description is omitted. The electrode structure in each pixel area in FIG. 7 is different from the electrode structure in each pixel area in FIG. 3 in that a second pixel electrode 123 comprises a plurality of electrodes 113b. Each electrode 113b comprises a first segment, a second segment, and a third segment. The first segment includes an angle of −θ from the horizontal. The second segment includes an angle of −φ from the horizontal. The third segment includes an angle of −θ from the horizontal. The angle of −θ is greater than the angle of −φ.

Figure 8:
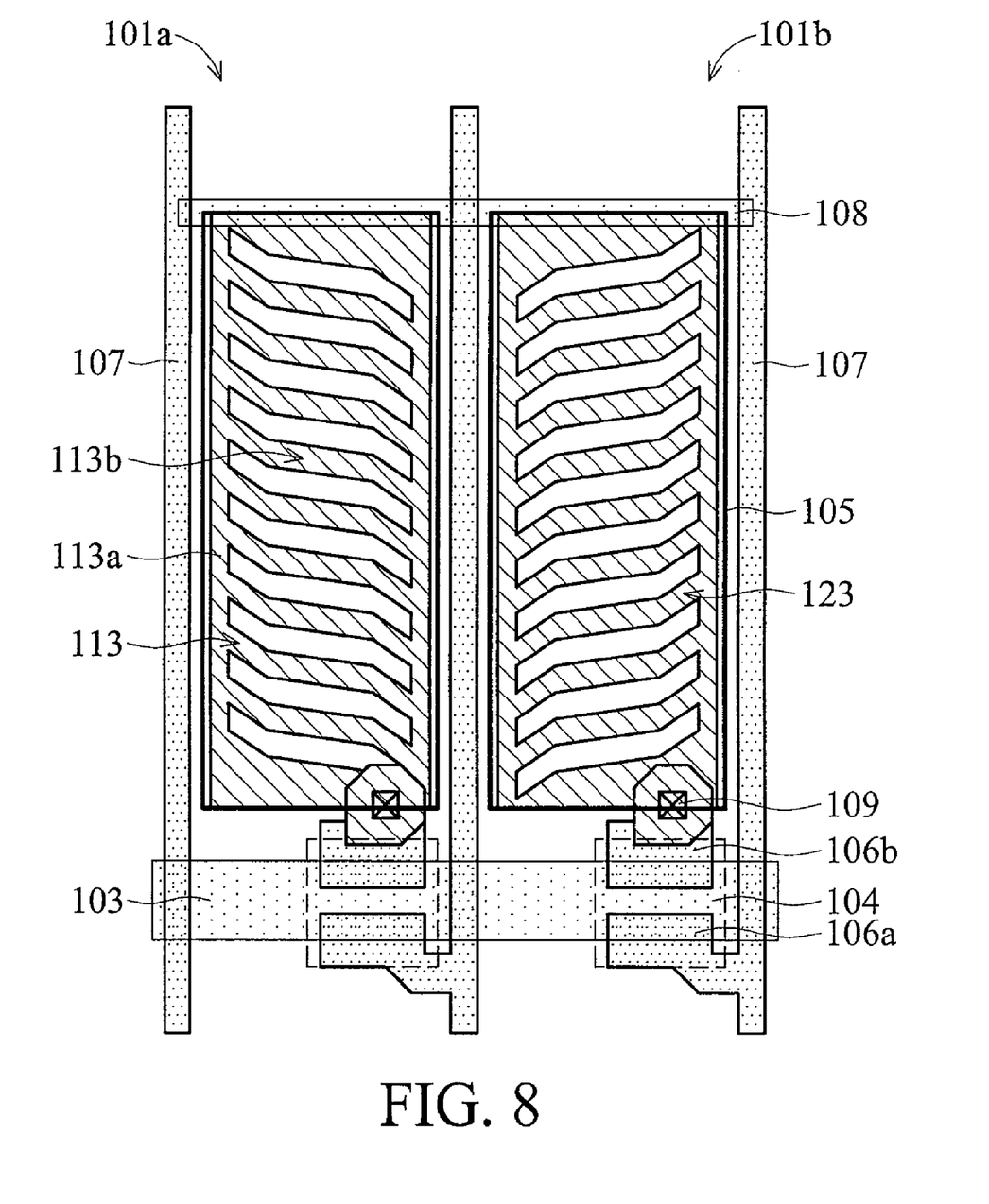
FIG. 8 is a plan view of another variation of the electrode structure in each pixel area of an FFS-LCD device according to a first embodiment of the invention.

FIG. 8 is a plan view of another variation of the electrode structure in each pixel area of an FFS-LCD device according to a first embodiment of the invention. In FIG. 8, the first pixel electrode 113 and the second pixel electrode 123 are mirror symmetrical horizontally.

Figure 9:
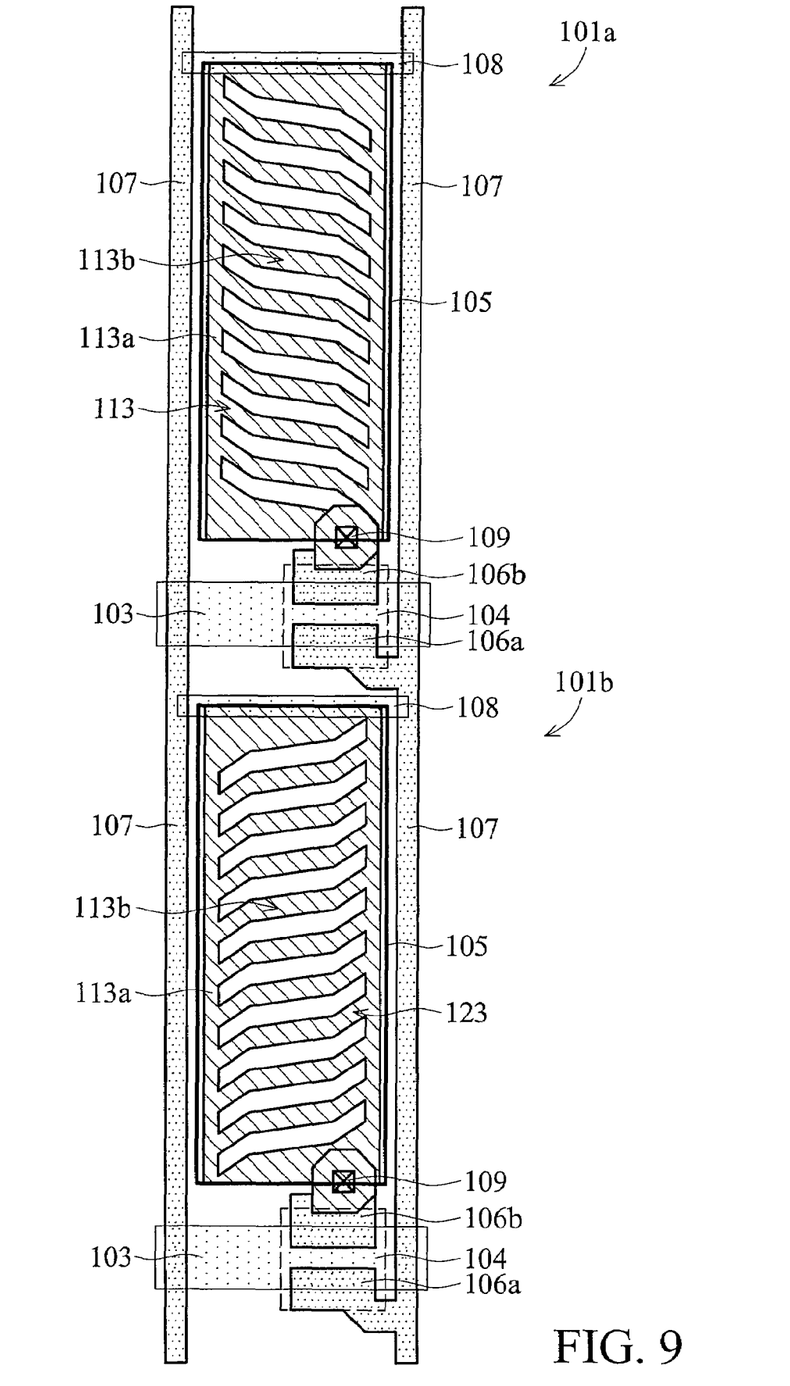
FIG. 9 is a plan view of another variation of the electrode structure in each pixel area of an FFS-LCD device according to a first embodiment of the invention.

FIG. 9 is a plan view of another variation of the electrode structure in each pixel area of an FFS-LCD device according to a first embodiment of the invention. In FIG. 9, the first pixel electrode 113 and the second pixel electrode 123 are vertically and symmetrically mirrored.

Second Embodiment

Figure 10:
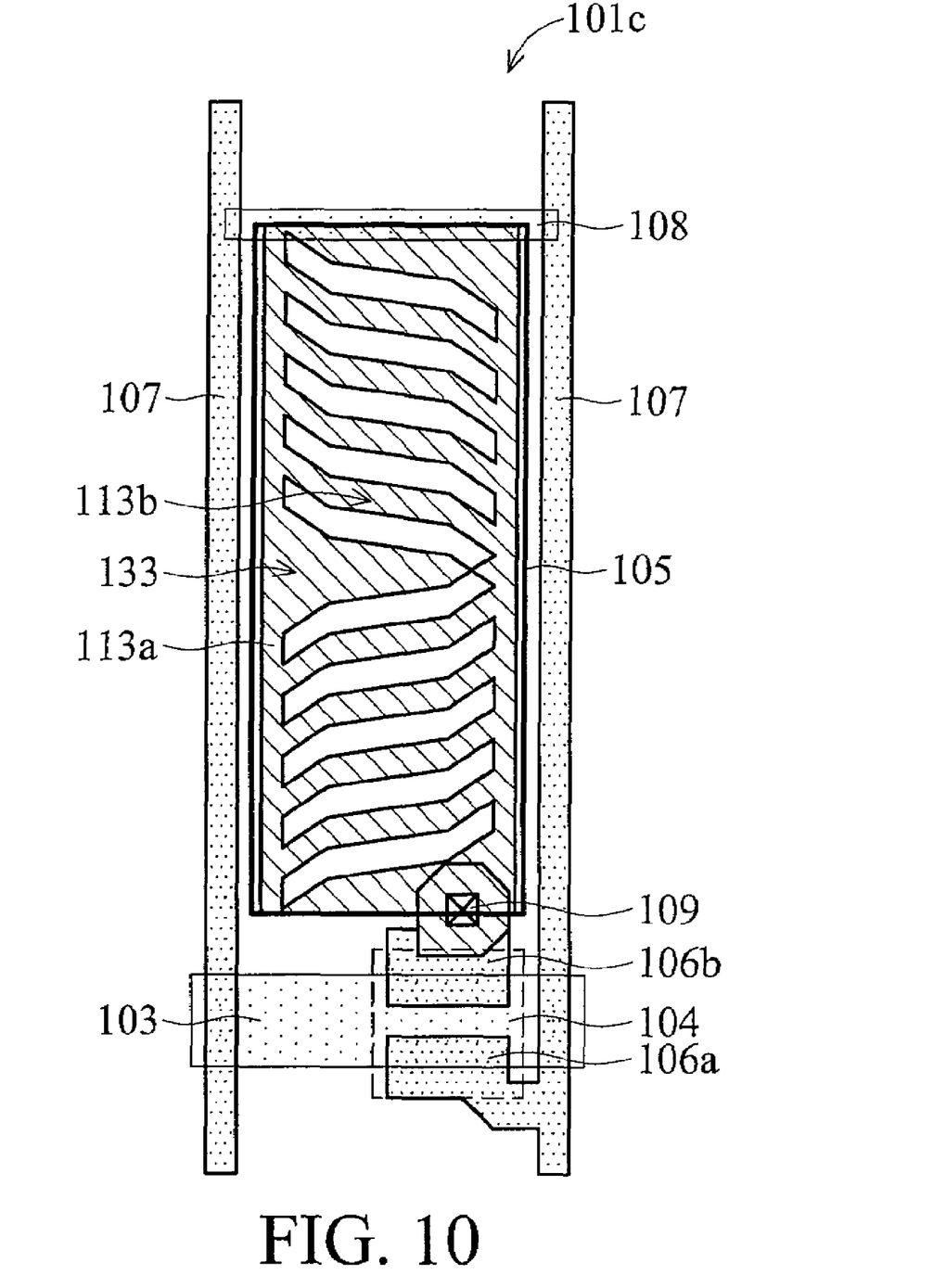
FIG. 10 is a plan view of an electrode structure in each pixel area of an FFS-LCD device according to a second embodiment of the invention.

FIG. 10 is a plan view of an electrode structure in each pixel area of an FFS-LCD device according to a second embodiment of the invention. Referring to FIG. 10, in order to improve the aperture ratio and transmittance ratio of the FFS-LCD device, the active matrix array substrate 101c of the second embodiment of the invention comprises a plurality of orthogonally intersecting gate lines 103 and data lines 107 disposed on a substrate 100. A plurality of pixel areas are defined by two adjacent gate lines 103 and data lines 107. A counter electrode 105 is disposed on the substrate 100 and in each pixel area. A pixel electrode 133 is disposed on the counter electrode 105 with at least one insulating layer therebetween. The pixel electrode 133 comprises an upper portion which comprises a plurality of parallel electrodes. Each electrode comprises a first segment, a second segment, and a third segment. The first segment includes an angle of θ from the horizontal. The second segment includes an angle of φ from the horizontal. The third segment includes an angle of θ from the horizontal. The angle of θ is greater than the angle of φ. The pixel electrode 133 further comprises a lower portion which comprises a plurality of parallel electrodes. Each electrode comprises a sixth segment, a seventh segment, and an eighth segment. The sixth segment includes an angle of −θ from the horizontal. The seventh segment includes an angle of −φ from the horizontal. The eighth segment includes an angle of −θ from the horizontal. The angle of −θ is greater than the angle of −φ. Note that the first portion of the pixel electrode and the second portion of the pixel electrode are vertically and symmetrically mirrored.

Third Embodiment

Figure 11:
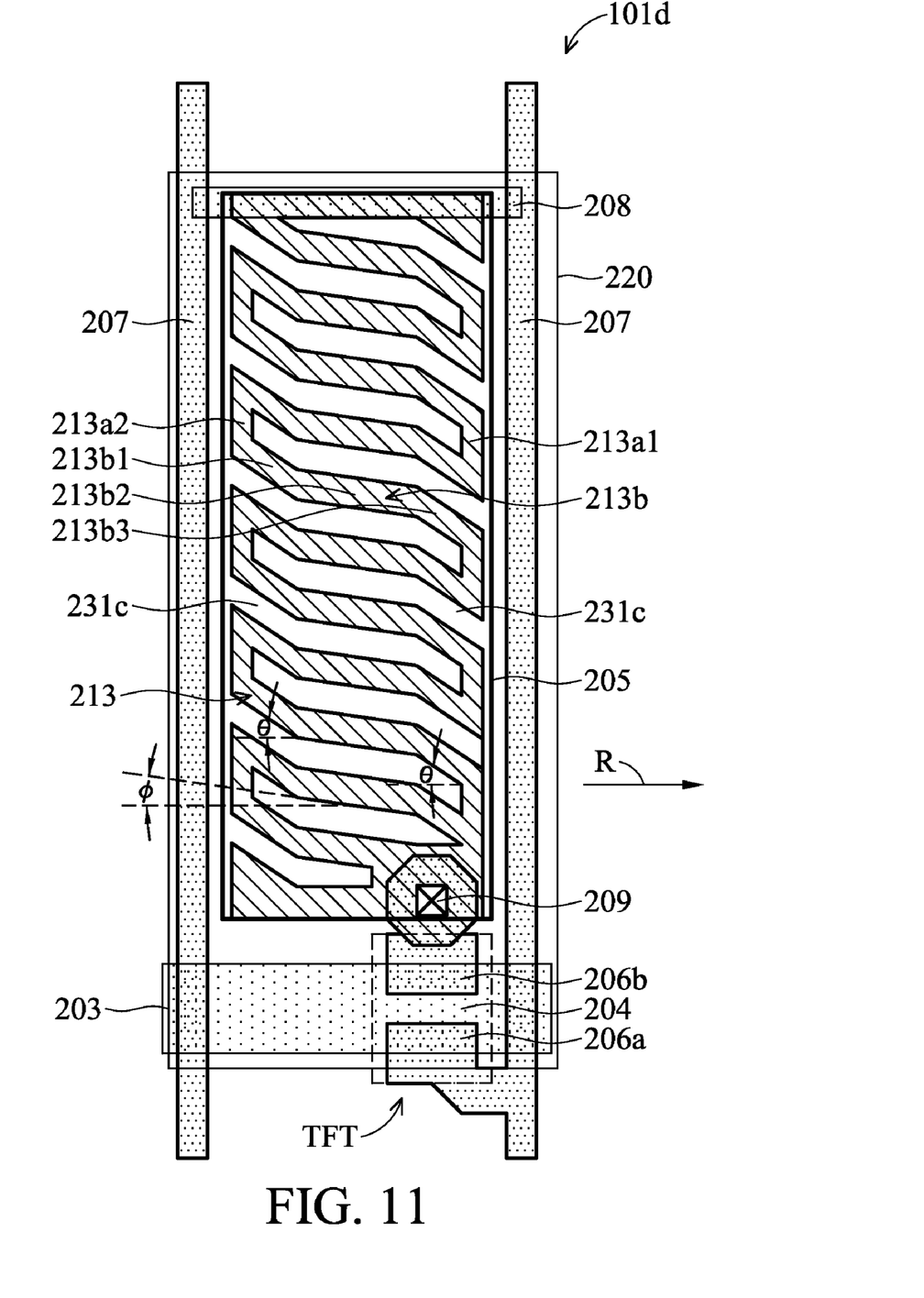
FIG. 11 is a plan view of an electrode structure in each pixel area of an FFS-LCD device according to a third embodiment of the invention.

FIG. 11 is a plan view of an electrode structure in each pixel area of an FFS-LCD device according to a third embodiment of the invention. Referring to FIG. 11, in order to improve the aperture ratio and transmittance ratio of the FFS-LCD device, the active matrix array substrate 101d of the third embodiment of the invention comprises a plurality of orthogonally intersecting gate lines 203 data lines 207 disposed on a substrate 200. A plurality of pixel areas are defined by two adjacent gate lines 203 and data lines 207. A counter electrode 205 is disposed on the substrate 200 and in each pixel area. A pixel electrode 213 is disposed on the counter electrode 205 with at least one insulating layer therebetween. The pixel electrode 213 comprises a plurality of parallel electrodes 213b. Each electrode 213b comprises a first segment 213b1, a second segment 213b2, and a third segment 213b3. The first segment 213b1 includes an angle of θ from the horizontal. The second segment 213b2 includes an angle of φ from the horizontal. The third segment 213b3 includes an angle of θ from the horizontal. The angle of θ is greater than the angle of φ. The pixel electrode 213 further comprises a fourth segment 213a1 connecting the third segment 213b3 of the odd electrodes and the third segment 213b3 of the even electrodes, and fifth segment 213a2 connecting the first segment 213b1 of the odd electrodes and the first segment 213b1 of the even electrodes. More specifically, the pixel electrode 213 is an S-shaped continuous zigzag line or an inverted S-shaped continuous zigzag line. Preferably the angle of θ is approximately in a range between 1° and 80° and the angle of φ is approximately in a range between 0° and 79°. Since in the region D neighboring the electrode bar 113a, the angle of θ of the third segment 113b3 deviated from the horizontal is greater than the angle of φ, the disclination effect can thus be prevented.

Furthermore, since a first opening 213c is formed between each adjacent fourth segments 213a1 and a second opening 213c between each adjacent fifth segments 213a2 of the pixel electrode 213 to increase aperture ratio and transmittance ratio of the FFS-LCD device. Preferably the width of the first and the second openings 213c is about 0.1 μm to 10 μm.

Referring to FIG. 11, a TFT device is disposed at the intersection of each gate line 203 and data line 207 and electrically coupled to the pixel electrode 213. The TFT device comprises a gate electrode 203, a channel and source/drain regions 204, and source contact 206a and drain contact 206b. The drain contact 206b connects the pixel electrodes 213 via a contact plug 209. By deflecting the angle of θ of the third segment 213b3 greater than the angle of φ, the physical area of TFT device can be reduced, and the area of the pixel electrodes 213 can nonetheless be increased resulting in improved high aperture ratio and high transmittance ratio.

Note that an alignment layer 220 which is horizontally rubbed (indicated as rubbing direction R) is optionally formed on the pixel electrode 213 of the substrate structure 101d.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A liquid crystal display device, comprising:
   a first substrate and a second substrate opposing each other with a predetermined gap therebetween;
   a liquid crystal layer interposed between the first and the second substrates;
   a gate line and a data line disposed on the first substrate in a matrix configuration and defining pixel areas;
   a counter electrode disposed on each pixel area of the first substrate;
   a pixel electrode disposed on the counter electrode with at least one insulating layer therebetween;
   a first opening between each adjacent fourth segments and a second opening between each adjacent fifth segments whereby increasing aperture ratio and transmittance ratio of the liquid crystal display device;
   wherein the pixel electrode comprises a plurality of parallel electrodes, and each parallel electrode comprises a first segment, a second segment, and a third segment;
   wherein the first segment includes an angle of θ from the horizontal, the second segment includes an angle of φ from the horizontal, and the third segment includes an angle of θ from the horizontal, and wherein the angle of θ is greater than the angle of φ; and
   wherein the pixel electrode further comprises a fourth segment connecting the third segment of the odd electrodes and the third segment of the even electrodes, and fifth segment connecting the first segment of the odd electrodes and the first segment of the even electrodes.

2. The liquid crystal display device as claimed in claim 1, further comprising a thin film transistor disposed at an intersection of each gate line and data line and electrically coupled to the first pixel electrode.

3. The liquid crystal display device as claimed in claim 1, wherein the width of the first and the second openings is about 0.1 μm to 10 μm.

4. The liquid crystal display device as claimed in claim 1, wherein the angle of θ is in an approximate range of between 1° and 80°.

5. The liquid crystal display device as claimed in claim 1, wherein the angle of φ is in an approximate range of between 0° and 79°.

6. The liquid crystal display device as claimed in claim 1, further comprising a common electrode line parallel to the gate line and connecting the counter electrode of each pixel area.

7. The liquid crystal display device as claimed in claim 1, further comprising an alignment layer disposed on the first pixel electrode of the first substrate and rubbed horizontally.

8. The liquid crystal display device as claimed in claim 1, wherein the fourth segment and the fifth segment are parallel to each gate line.

* * * * *